Patented June 12, 1928.

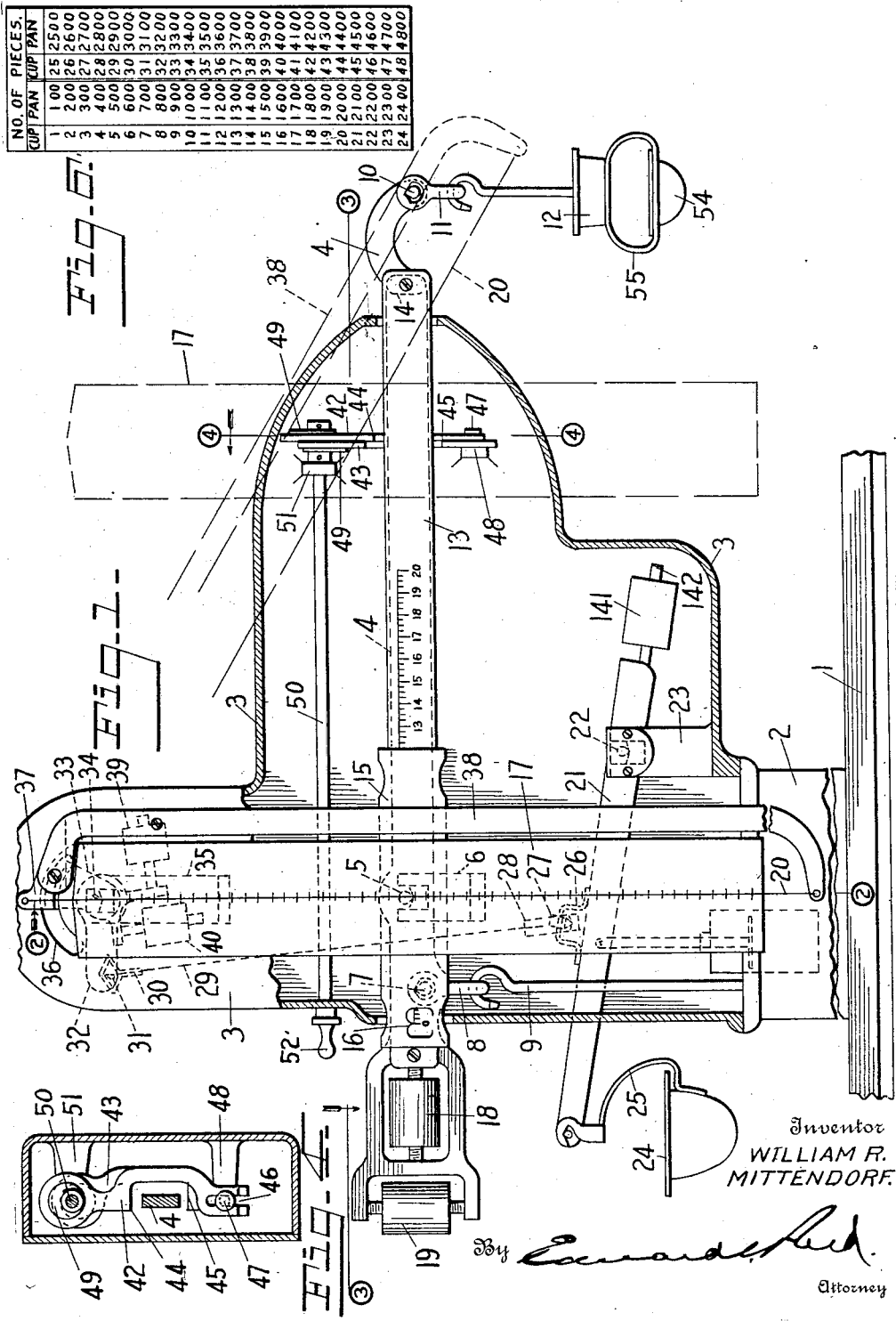

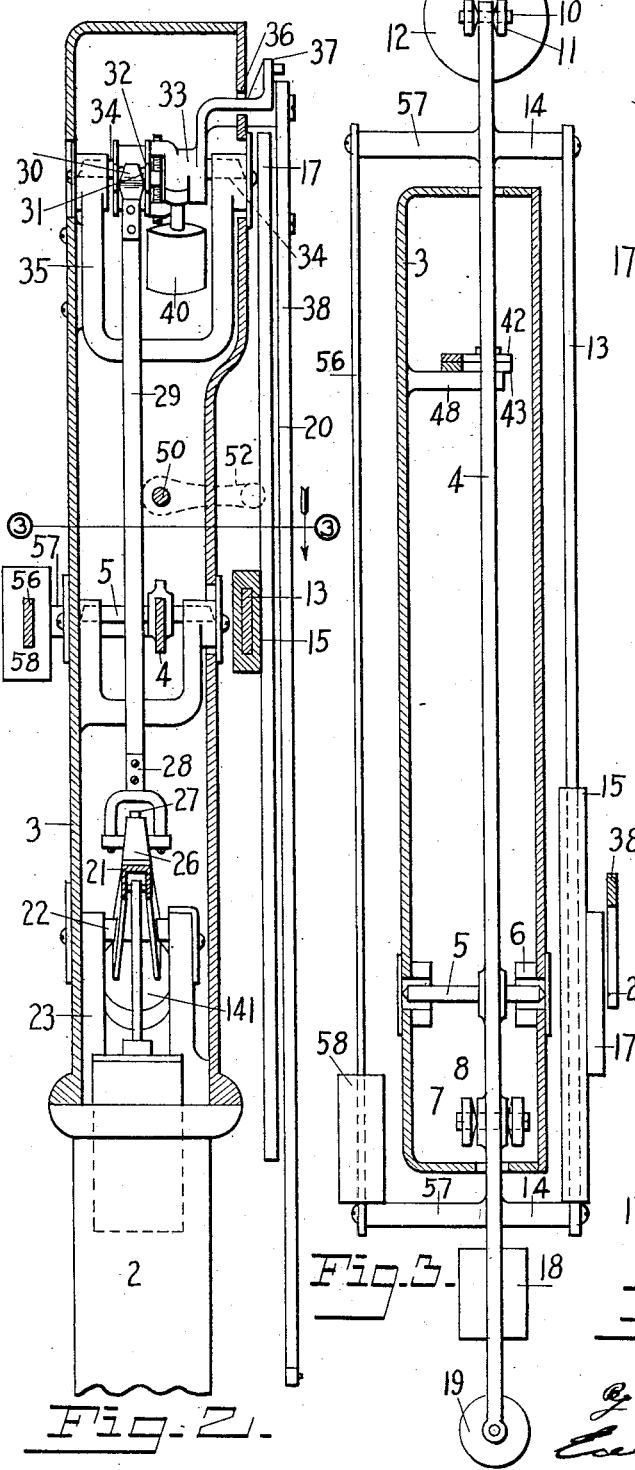

1,672,952

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COMPUTING SCALE.

Application filed October 10, 1923. Serial No. 667,600.

This invention relates to computing scales of the beam type.

One object of the invention is to provide a beam scale with computing devices whereby parts may be accurately counted or other computations accurately effected.

A further object of the invention is to provide a beam scale with independently controlled separately movable indicating members such as are shown in the application for patent filed by me September 23, 1922, Serial No. 590,085.

A further object of the invention is to provide a computing scale of the beam type which will be simple in its construction, inexpensive to manufacture and which will not be liable to become disarranged or out of balance.

Other objects of the invention will appear as the device is described in detail.

In the accompanying drawings Fig. 1 is a front elevation of a mechanism embodying my invention with the casing in section and partly broken away; Fig. 2 is a sectional view taken on the line 2—2 of Fig. 1; Fig. 3 is a sectional view taken on the line 3—3 of Fig. 2; Fig. 4 is a section taken on the line 4—4 of Fig. 1; Fig. 5 is a detail view of the computing chart; and Fig. 6 is a detail view of the wall chart.

In these drawings I have illustrated one embodiment of my invention and have shown the same applied to a beam scale which in its general features of construction is of the ordinary type. Associated with this scale are two independently adjustable indicating members by means of which the computations are effected. One of these members is connected with the poise which moves along the beam, so that the position of that indicating member will bear a direct relation to the load on the load platform of the scale. The second indicating member is adjusted independently of the beam and its cooperating parts and according to a unit of computation, so that its relation to the first mentioned indicating member will denote the result of the computation. When the invention is applied to a counting scale, as in the present instance, the last mentioned indicating member is preferably controlled by a unit balance. As here shown, the two indicating members are so arranged that when both have been adjusted, one under the control of the load and the other under the control of the unit, they will intersect and the indication at the point of intersection will be the result of the computation. Inasmuch as one of the indicating members is carried by the beam, which is subject to vibration, I also prefer to provide means whereby this beam can be locked in its balanced or central position during the taking of a reading from the indicating devices, thereby insuring the accuracy of the reading. It will be understood that the particular embodiment of the invention here illustrated has been chosen for the purpose of illustration only and that the invention may be applied to scales of various kinds and that the mechanism may take various forms without departing from the spirit of the invention.

In that particular embodiment of the invention here illustrated the scale comprises a base having a load platform 1 above which projects a standard 2 on which is mounted a casing 3 which, in the present instance, constitutes a supporting frame for the several parts of the mechanism and also encloses various parts of the mechanism. The load balance comprises a beam 4 which is pivotally mounted between its ends, preferably by means of knife edge pivots 5, on bearings formed in the two arms of a bracket 6 which is rigidly secured to the rear wall of the casing or main frame. At one side of the pivot pin 5 the beam is provided with a pivot pin 7 which supports a stirrup 8 adapted to receive the hook of the draft rod 9 which extends downwardly through the standard 2 and is connected with the load platform 1, in any suitable manner. At the opposite end of the beam there is mounted a knife edge pivot 10 which supports a stirrup 11 adapted to be engaged by the hook of the usual counterpoise 12 which also serves as a support for loose weights. The poise may be mounted directly on the beam 4 if desired but inasmuch as the poise is to be connected with one of the indicating members it is preferable that it should be arranged outside of the casing and I have in the present instance shown a bar 13 as carried by and forming a part of the beam but arranged outside of the casing 2. This bar extends parallel with the beam and is connected at its respective ends with laterally extending lugs 14 rigidly secured to the beam 4. Slidably mounted upon the bar 13 is a poise 15 which may, if desired, be provided with a reading opening and pointer, as shown at 16, by means of which its position with relation to the weight graduations on the bar 13 may be determined. This is not, however, essential to the operation of the computing mechanism but enables the mechanism to be used for determining the weight of the load on the platform.

One of the indicating members is connected with and operated by the poise 15. Preferably the indicating member is mounted directly upon the poise so as to move therewith. In the present instance I have shown one of the indicating members as an elongated chart 17 having a single series of graduations extending lengthwise thereof and having arranged thereon a plurality of columns of numerals, the corresponding numerals of the several columns being associated with the same graduation and serving to indicate variations in the significance or value of the graduation as this is affected by the variations in the unit of computation. In the present counting scale the unit of computation consists of a unit comprising one or more of the articles to be counted and the columns of figures represent, respectively, the values of the graduations when the unit consists of certain predetermined numbers of articles. The number of articles contained in each unit is indicated by the number at the head of the column.

In the present construction this elongated chart is rigidly secured to the poise 15 so that it will extend at right angles to the bar 13 of the beam and will, consequently, be adjusted along the beam by each adjustment of the poise. The beam 4 is also provided with balance weights 18 and 19 adjustable along intersecting lines for the purpose of sealing the lever and the zero balance of the scale in the usual manner. In the present device the chart 17 is carried by the poise 15 and its weight must be taken into consideration in designing the poise but the chart is otherwise distinct from the poise, both structurally and functionally, and it may be associated with the poise in any suitable manner.

The second indicating member is preferably in the form of a wire or other similar member, which is pivotally supported on a fixed axis and is adapted to be moved into an inclined position, which position is determined by the unit of computation. When the indicating wire is in its normal position and the poise 15 is at its zero position the indicating wire, which is shown at 20, will extend parallel with and will be arranged directly in front of the center line of the chart 17. When the poise has been adjusted to balance a load on the load platform and the wire has been adjusted according to a unit of computation the two indicating members will intersect and that graduation on the chart which is intersected by the wire will represent the result of the computation. As has been stated, in a counting scale I prefer to control the second indicating member or wire by means of a unit balance and I have here shown a unit balance comprising a lever 21 pivotally mounted at a point between its ends by means of a knife edge pivot 22 which engages bearings on standards 23 carried by the casing 3. This lever is here shown as a lever of the second principle but it will be understood that it may be of any suitable type. At one end this lever is provided with a unit receptacle 24 which is preferably supported by a holder 25 which is pivotally supported on the end of the lever 21. At a point between the pivot pin 22 and the point of connection of the unit receptacle therewith the lever 21 is provided with a bracket 26 having a needle point 27 which engages the bearing in the cross bar of a stirrup 28 rigidly secured to a flexible tape or ribbon 29. The other end of the ribbon or tape 29 is secured to a stirrup 30 having a bearing which engages a knife edge pivot 31 on an arm 32 rigidly secured to a hub structure 33. This hub structure is provided with knife edge pivots 34 which engage bearings formed in the arms of a bracket 35 which is rigidly secured to the back wall of the casing 2. Rigidly secured to the hub member 33 and extending through an opening in the front wall of the housing, as shown at 36, is an arm 37 to which is rigidly secured a supporting member or bar 38 which carries the indicator wire 20. Balance weights 39 and 40 are connected with the hub member 33 for adjustment along intersecting lines and serve as a means for establishing the center of gravity of the hub member 33 and the parts attached to it at such a point in relation to the knife edge of the pivot 34 and a plumb line extending through said edge as to produce the effect of a rising pendulum, whereby is created a counterbalance for the weight of the unit in the unit receptacle 24. It will be obvious, however, that the mechanism may be so arranged as to give a counterbalancing action similar to that of the reverse pendulum, which is normally elevated and descends as the load is applied to the lever. The initial load of the lever 20, or the tension required on the ribbon 29 at the zero position may be regulated by a weight 141 adjustably mounted on a screw 142 rigidly secured to and projecting from that end of the lever 21 opposite the unit receptacle. It will be apparent, therefore, that a load having been placed upon the platform, and the poise 15 adjusted to balance that load, the chart 17 will occupy a position corresponding to the weight of the load. When a unit is placed in the unit receptacle 24 the indicating member or wire 20 will be swung about the axis of the hub member 33 to an angle of inclination or position directly corresponding to the weight of the unit and will intersect the chart 17, the intersected graduation on the chart representing the result of the computation or count.

Inasmuch as the chart is carried by the beam, which is subject to vibratory movements, it is desirable that some means shall be provided for holding the beam against movement while a reading is being taken, thereby insuring the accuracy of the reading. To this end I have arranged near the outer end of the beam a locking device which consists of two arms 42 and 43 having shoulders 44 and 45, respectively, arranged above and below the beam 4. These arms or locking members are movable in opposite directions to cause the respective shoulders to engage the beam at its center position and to retain the same in that position. As here shown, the locking members are slotted, as shown at 46, to embrace a stud 47 carried by a bracket 48 extending from the back wall of the casing 2. At its upper end each locking member is mounted on an eccentric 49 the two eccentrics being rigidly secured to a shaft 50 which is journaled in a bracket 41 also mounted on the back wall of the casing 2. The two eccentrics are so arranged with relation one to the other that the movement of the shaft in one direction will cause the simultaneous movement of the two locking members in opposite directions. The shaft 50 extends across the casing of the machine and through the wall at the left hand side thereof where it is provided with an operating handle or crank 52 by means of which it may be rotated to cause the beam to be locked in its central position.

The operation of the device will be readily understood from the foregoing description of the several parts thereof. It will be apparent that when it is desired to determine the number of parts in a mass of articles of like kind, the mass is placed on the load platform of the load balance and the poise 15 moved to the right, in Fig. 1, to a position in which it will exactly counterbalance the load on the platform, that is, until a state of equilibrium is produced in the load balance mechanism. The crank 52 is then actuated to cause the locking device to engage the beam and secure the same firmly in its central or balanced position. A unit comprising a definite number of parts is then placed in the unit receptacle 24, the particular number of parts required for the unit depending upon the weight necessary to bring the indicator wire 20 to a position in which it will intersect the series of graduations on the computing chart 17. The value of the graduation which is thus intersected by the wire, when read in the column of numerals on the chart corresponding to the number of pieces in the unit receptacle, indicates the number of pieces contained in the load on the load platform of the scale. When it is desired to count out a certain predetermined number of parts the beam is first locked in its central position, by the manipulation of the shaft 50, and the number corresponding to the number of parts which it is desired to count out is then located on the computing chart in that series of numerals on the chart, in which the number appears furthest down on the chart and a unit consisting of a number of parts corresponding to the column of numerals thus selected is placed in the unit receptacle 24. Thus if the desired number appears furthest down on the chart in the column of numerals designated by the numeral 5 then the unit should consist of five pieces. The poise 7 is then positioned on the beam in a location in which the graduation on the chart corresponding to the number of parts desired is intersected by the indicator wire. The beam 4 is then released and the parts are placed on the load platform of the scale in sufficient quantities to cause the beam to balance, or to establish the equilibrium of the load balance mechanism. The number of parts necessary to establish this equilibrium will be the number desired.

For the purpose of counting a number of parts the weight of which is in excess of the load capacity of the beam, I have provided a scale with a fixed ratio unit receptacle which, in the present instance, is shown at 54 as carried by a holder 55 depending from the counterpoise 12. The fixed ratio unit receptacle is so located with relation to the fulcrum of the beam that the ratio between the unit receptacle and the load platform will be some fixed amount, preferably an amount, convenient for multiplication, such as 100. When a mass of articles is to be counted that is in excess of the capacity of the scale for direct computation a unit is placed in the unit receptacle 24. The number of pieces comprising the unit should preferably be sufficient to move the indicator wire until it will intersect the graduations on the computing chart when the same is in its furthermost right hand position. The poise 15 is then moved to its furthest right hand position but the weight of the mass on the load platform will be such that the poise will not move the beam downwardly. The operator then counts into the fixed ratio unit receptacle 54 a number of parts sufficient to move the beam to its lowermost position. The poise is then moved to the left until the beam is balanced, or equilibrium established. The operator then multiplies the number or articles placed in the unit receptacle 54 by 100 and adds the product to the number indicated on the chart 17, thereby getting the total number of parts on the platform. If desired, a wall chart, such as is shown in Fig. 6, may be provided to give the number of parts on the platform for certain specified numbers of parts in the fixed ratio unit receptacle, thereby eliminating the possiblity of error in the making of the multiplication.

If desired, the scale may also be provided with a tare beam, which may be attached to any suitable lever of the load balance mechanism but is preferably connected with the beam and is here shown at 56 as carried by two laterally projecting lugs 57 carried by the beam, and is provided with a tare poise 58.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a scale, a beam, a poise carried by said beam and adjustable relatively thereto, a chart connected with and adjustable by said poise, an indicating member to cooperate with said chart, and a device to adjust said indicating member according to a unit of computation.

2. In a scale, a beam, a poise carried by said beam and adjustable relatively thereto, a chart connected with and adjustable by said poise, an indicating member to cooperate with said chart, and a device to adjust said indicating member according to a unit of computation, and means other than said chart and said indicating member to indicate the weight of a load on said beam.

3. In a scale, a beam, a poise carried by said beam and adjustable relatively thereto, an indicating member supported by said beam and adjustable relatively thereto by the movement of said poise, a pivoted indicating member having swinging movement into and out of cooperative relation with the first mentioned indicating member, and a device to adjust said pivoted indicating member according to a unit of computation.

4. In a scale, a beam, a poise carried by said beam and adjustable relatively thereto, an elongated indicating member carried by said poise, a second indicating member mounted for swinging movement into cooperating intersecting relation with the first mentioned indicating member, and a device to adjust said second indicating member according to a unit of computation.

5. In a scale, a beam, a poise carried by said beam and adjustable relatively thereto, an indicating member connected with and adjustable by said poise, a second indicating member to cooperate with the first mentioned indicating member, and a unit receptacle mounted for movement and operatively connected with said second indicating member to adjust the same with relation to the first mentioned indicating member according to the weight of a unit.

6. In a scale, a beam, a poise carried by said beam and adjustable relatively thereto, an indicating member connected with and adjustable by said poise, a second indicating member to cooperate with the first mentioned indicating member, a unit receptacle mounted for movement and operatively connected with said second indicating member to adjust the same with relation to the first mentioned indicating member according to a unit of computation, and means other than said indicating members to indicate the weight of a load on said beam.

7. In a scale, a beam, a poise carried by said beam and adjustable relatively thereto, an indicating member supported by said beam and adjustable relatively thereto by the movement of said poise, a second indicating member to cooperate with the first mentioned indicating member, and a unit receptacle mounted for movement and operatively connected with said second indicating member to adjust the same with relation to the first mentioned indicating member according to the weight of a unit.

8. In a scale, a beam, a poise carried by said beam and adjustable relatively thereto, an indicating member carried by said poise, a second indicating member to cooperate with the first mentioned indicating member, and a unit receptacle mounted for movement and operatively connected with said second indicating member to adjust the same with relation to the first mentioned indicating member according to the weight of a unit.

9. In a scale, a beam, a poise carried by said beam and adjustable relatively thereto, an indicating member mounted for movement lengthwise of said beam and operatively connected with said poise, a pivoted indicating member mounted for movement into a position to intersect the first mentioned indicating member, and means independent of said beam to control the position of said second indicating member.

10. In a scale, a beam, a poise carried by said beam and adjustable relatively thereto, an indicating member mounted for movement lengthwise of said beam and operatively connected with said poise, a pivoted indicating member mounted for movement into a position to intersect the first mentioned indicating member, and a movable unit receptacle to control the pivotal movement of said second indicating member.

11. In a scale, a beam, a poise carried by said beam and adjustable relatively thereto, a chart supported by said beam and operatively connected with said poise for movement along said beam, a pivoted indicating member mounted for movement into a position in which it will intersect said chart when the latter has been moved from its zero position, and means for controlling the movement of said pivoted indicating member according to a unit of computation.

12. In a scale, a beam, a poise carried by said beam and adjustable relatively thereto, an elongated chart carried by said poise and extending transversely to said beam, a pivoted indicating member to cooperate with said chart, and a movable unit receptacle to control the movement of said pivoted indicating member.

13. In a scale, a beam, a bar secured to and forming a part of said beam, a poise mounted on said bar and adjustable lengthwise of said beam, an indicating member supported by said bar and adjustable with said poise, a pivoted indicating member cooperating with the first mentioned indicating member, and a movable unit receptacle to control the movement of said indicating member.

14. In a scale, a beam, a bar rigidly connected with said beam and forming a part thereof, a poise slidably mounted on said bar, said bar having weight graduations and said poise having a part to register with said weight graduations, an indicating member supported by said bar and adjustable with said poise, a pivoted indicating member to cooperate with the first mentioned indicating member, and a movable unit receptacle to control the movement of said pivoted indicating member.

15. In a scale, a beam, a casing through which said beam extends, a bar rigidly secured to said beam and forming part thereof and arranged exteriorly of said casing, a poise mounted on said bar, an indicating member supported by said bar and adjustable with said poise, a pivoted indicating member cooperating with the first mentioned indicating member, and a movable unit receptacle to control the movement of said pivoted indicating member.

16. In a scale, a housing, a beam extending into said housing, a bar rigidly secured to said beam and forming a part thereof and arranged exteriorly of said housing, a poise adjustably mounted on said bar, a chart rigidly secured to said poise, a pivoted indicating member to cooperate with said chart, and a movable unit receptacle to control the movement of said pivoted indicating member.

17. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, and means for securing said beam in its balanced position.

18. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, a unit receptacle mounted for movement and operatively connected with said second indicating member, and means for securing said beam in its central position while a reading is being taken from said indicating members.

19. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, a locking device comprising members arranged above and below said beam, and means for moving said members into positions to engage the respective edges of said beam when the latter is in its balanced position.

20. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, cooperating locking members having parts arranged respectively above and below said beam, and means for actuating said locking members to cause said parts to engage the respective edges of said beam when the latter is in its balanced position.

21. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, cooperating locking members having parts arranged respectively above and below said beam, and means for simultaneously moving said locking members in opposite directions to cause said parts to engage the respective edges of said beam when the latter is in its balanced position.

22. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, a locking device for said beam comprising members mounted for movement in opposite directions and having parts arranged respectively above and below said beam, and an actuating device connected with said members for moving the same in opposite directions to cause said parts of said members to engage the respective edges of said beam when the latter is in its balanced position.

23. In a scale, a beam, a poise carried by said beam and adjustable relatively thereto, an indicating member connected with and adjustable by said poise, a second indicating member to cooperate with the first mentioned indicating member, means independent of said beam and said poise to control the position of said second indicating member according to a unit of computation, a shaft, a pair of eccentrics mounted on said shaft, locking members carried by said eccentrics and having parts arranged respectively above and below said beam, and means for guiding said locking members in a substantially vertical line, said eccentrics being so arranged that the rotation of said shaft will move said locking members in opposite directions and cause the same to engage the respective edges of said beam when the latter is in its balanced position.

24. In a scale, a beam, a poise carried by said beam and adjustable relatively thereto, an indicating member connected with and adjustable by said poise, a second indicating member to cooperate with the first mentioned indicating member, means comprising a pivoted structure mounted independently of said second indicating member and operatively connected therewith to control the position of said second indicating member according to a unit of computation, and a unit receptacle connected with said beam at a fixed point.

25. In a scale, a beam, a poise carried by said beam and adjustable relatively thereto, an indicating member connected with and adjustable by said poise, a second indicating member to cooperate with the first mentioned indicating member, a unit receptacle mounted for movement and operatively connected with said second indicating member, and a unit receptacle connected with said beam.

26. In a scale, a beam, means to establish the equilibrium thereof, an indicating member associated with said beam, cooperating locking members having parts arranged respectively above and below said beam, and means for simultaneously moving said locking members in opposite directions and in substantially straight lines extending transversely to said beam to cause said parts of said locking members to engage the respective edges of said beam when the latter is in its balanced position and to prevent the longitudinal movement of said beam by said locking members.

27. In a scale, a beam, means to establish the equilibrium thereof, an indicating member associated with said beam, a locking device for said beam comprising members slidably mounted for reciprocatory movement in opposite directions and having parts arranged respectively above and below said beam, and an actuating device connected with said members for moving the same in opposite directions to cause said parts thereof to engage the respective edges of said beam when the latter is in its balanced position.

28. In a scale, a beam, means to establish the equilibrium thereof, an indicating member associated with said beam, a shaft, a pair of eccentrics mounted on said shaft, locking members carried by the respective eccentrics and having parts arranged respectively above and below said beam, and means for guiding said locking members in a substantially vertical line, said eccentrics being so arranged that the rotation of said shaft will move said locking members in opposite directions and cause the same to engage the respective edges of said beam when the latter is in its balanced position.

29. In a scale, a beam, a poise carried by said beam and adjustable relatively thereto, an elongated chart carried by said poise and extending transversely to said beam, a pivoted indicating member to cooperate with said chart, and means other than said beam and its poise to control the position of said pivoted indicating member according to a unit of computation.

30. In a scale, a load actuated beam, a poise mounted thereon and adjustable relative thereto, an indicating member connected with and adjustable with said poise, a second indicating member cooperating with the first mentioned indicating member, a device to adjust said second indicating member according to a unit of computation and to retain the same in its adjusted position, and means for securing said beam in its balanced position, whereby said indicating members will be held in fixed relation one to the other while a reading is being taken therefrom.

31. In a scale, a load actuated beam, a poise mounted thereon and adjustable relative thereto, an indicating member connected with and adjustable with said poise, a second indicating member cooperating with the first mentioned indicating member, a device to adjust said second indicating member according to a unit of computation and to retain the same in its adjusted position, means other than said indicating members to indicate the weight of a load applied to said beam, and means for securing said beam in its balanced position, whereby said indicating members will be held in fixed relation one to the other while a reading is being taken therefrom.

32. In a scale, a load actuated beam, a poise mounted thereon and adjustable relative thereto, an indicating member connected with and adjustable with said poise, a second indicating member cooperating with the first mentioned indicating member, a unit receptacle operatively connected with said second indicating member, and means for securing said beam in its balanced position.

33. In a scale, a load actuated beam, a poise mounted thereon and adjustable relative thereto, an indicating member connected with and adjustable with said poise, a second indicating member cooperating with the first mentioned indicating member, a unit receptacle operatively connected with said second indicating member, means other than said indicating members to indicate the weight of a load applied to said beam, and means for securing said beam in its balanced position.

34. In a scale, a load actuated beam, a poise mounted thereon and adjustable relative thereto, an indicating member connected with and adjustable with said poise, a second indicating member cooperating with the first mentioned indicating member, a device to adjust said second indicating member according to a unit of computation and to retain the same in its adjusted position, and a unit receptacle connected with said beam.

35. In a scale, a load actuated beam, a poise mounted thereon and adjustable relative thereto, an indicating member connected with and adjustable with said poise, a second indicating member cooperating with the first mentioned indicating member, a device to adjust said second indicating member according to a unit of computation and to retain the same in its adjusted position, means other than said indicating members to indicate the weight of a load applied to said beam, and a unit receptacle connected with said beam.

36. In a scale, a load actuated beam, a poise mounted thereon and adjustable relative thereto, an indicating member connected with and adjustable with said poise, a second indicating member cooperating with the first mentioned indicating member, a unit receptacle operatively connected with said second indicating member, means other than said indicating members to indicate the weight of a load applied to said beam, and a second unit receptacle connected with said beam.

37. In a scale, a load actuated beam, a poise mounted thereon and adjustable relative thereto, an indicating member connected with and adjustable with said poise, a second indicating member cooperating with the first mentioned indicating member, a device to adjust said second indicating member according to a unit of computation and to retain the same in its adjusted position, a unit receptacle connected with said beam, and means for securing said beam in its balanced position.

38. In a scale, a load actuated beam, a poise mounted thereon and adjustable relative thereto, an indicating member connected with and adjustable with said poise, a second indicating member cooperating with the first mentioned indicating member, a device to adjust said second indicating member according to a unit of computation and to retain the same in its adjusted position, means other than said indicating members to indicate the weight of a load applied to said beam, a unit receptacle connected with said beam, and means for securing said beam in its balanced position.

39. In a scale, a load actuated beam, a poise mounted thereon and adjustable relative thereto, an indicating member connected with and adjustable with said poise, a second indicating member cooperating with the first mentioned indicating member, a unit receptacle operatively connected with said second indicating member, a second unit receptacle connected with said beam, and means for securing said beam in its balanced position.

40. In a scale, a load actuated beam, a poise mounted thereon and adjustable relative thereto, an indicating member connected with and adjustable with said poise, a second indicating member cooperating with the first mentioned indicating member, a unit receptacle operatively connected with said second indicating member, means other than said indicating members to indicate the weight of a load applied to said beam, a second unit receptacle connected with said beam, and means for securing said beam in its balanced position.

In testimony whereof, I affix my signature hereto.

WILLIAM R. MITTENDORF.